Dec. 28, 1937.  G. R. GREENSLADE  2,103,256
METHOD OF AND MEANS FOR TESTING STAYBOLTS
Filed Sept. 4, 1934  3 Sheets-Sheet 1
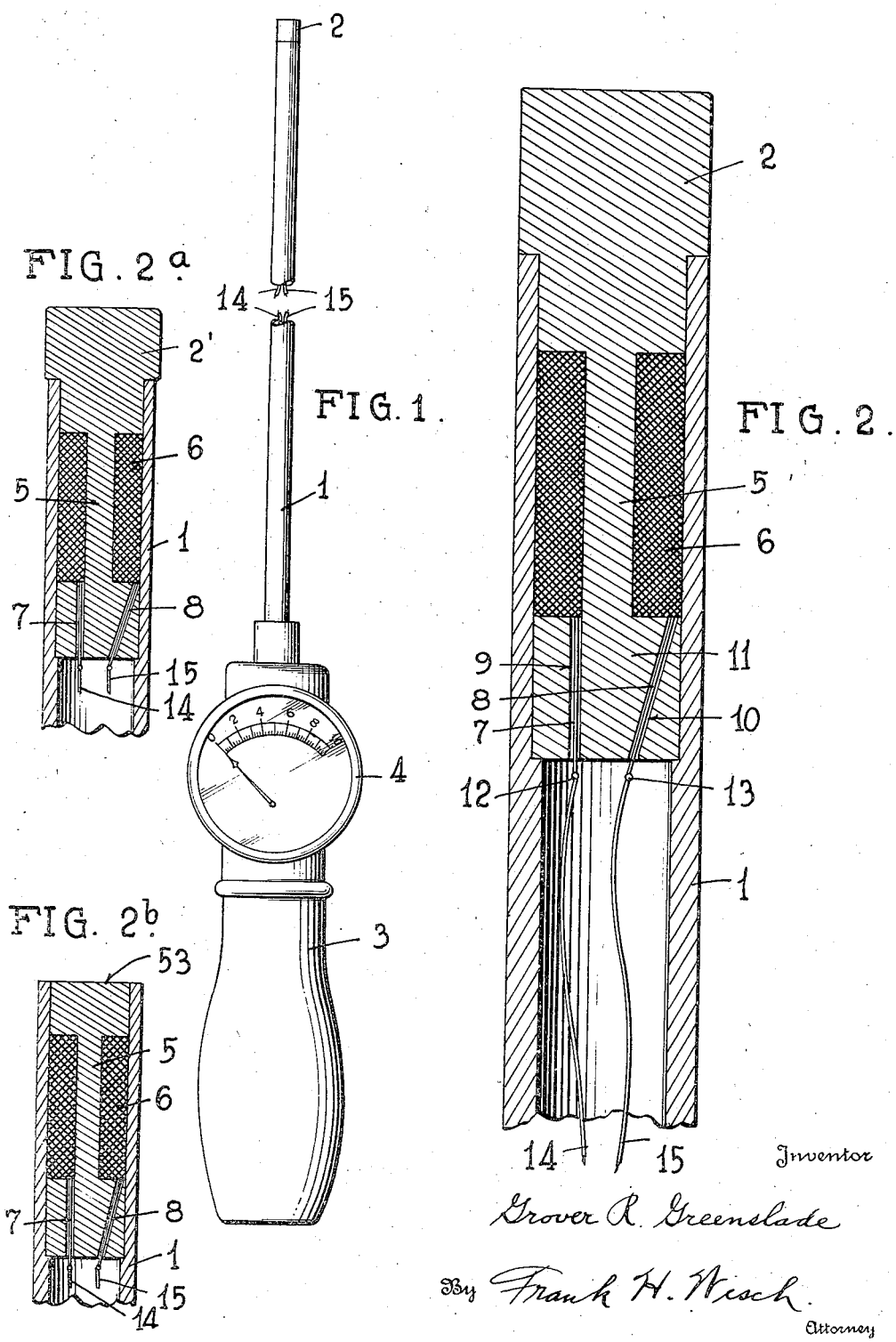
Inventor
Grover R. Greenslade
By Frank H. Wisch.
Attorney Dec. 28, 1937.   G. R. GREENSLADE   2,103,256
METHOD OF AND MEANS FOR TESTING STAYBOLTS
Filed Sept. 4, 1934   3 Sheets-Sheet 2
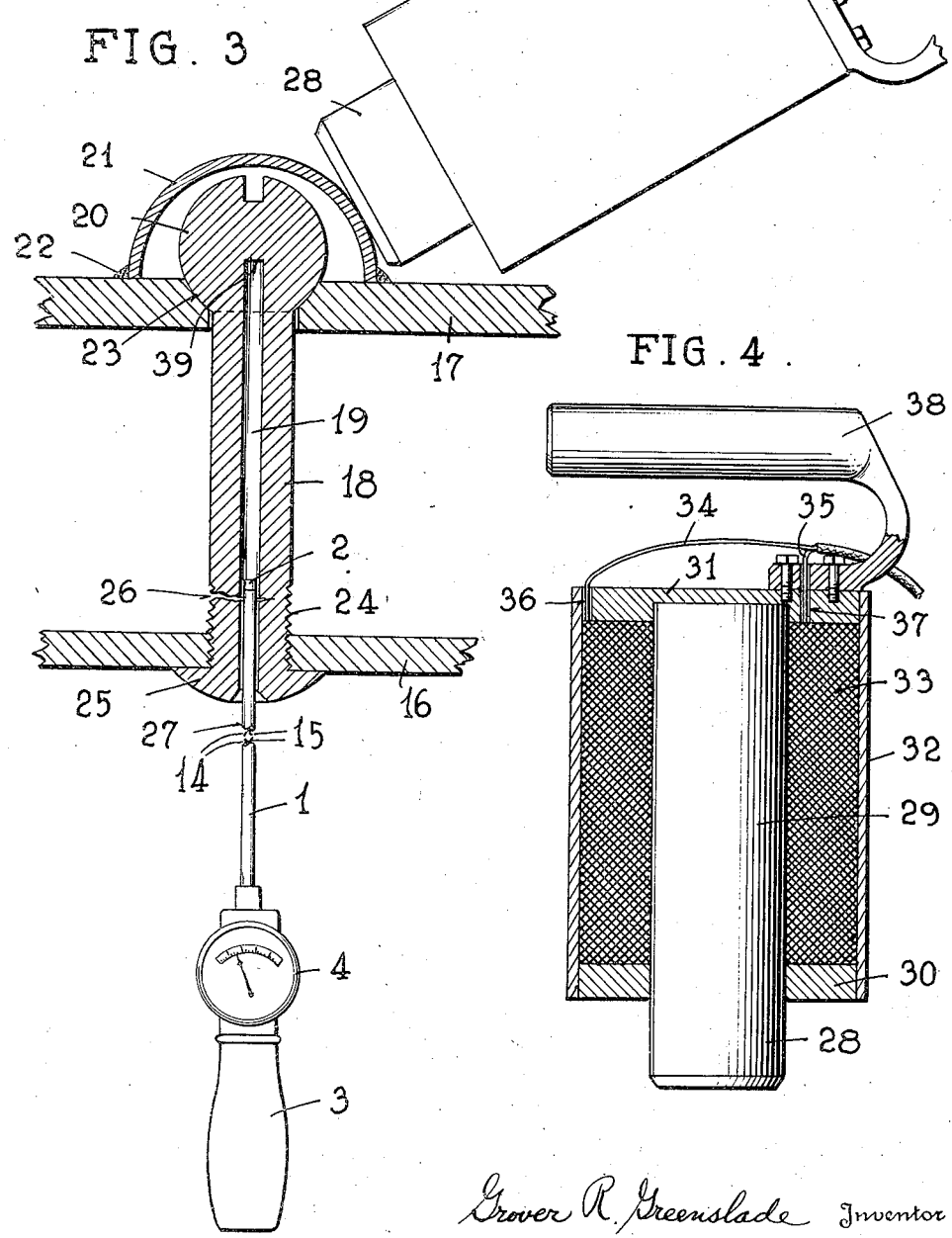
Grover R. Greenslade Inventor
By Frank H. Wisch
Attorney Dec. 28, 1937.   G. R. GREENSLADE   2,103,256
METHOD OF AND MEANS FOR TESTING STAYBOLTS
Filed Sept. 4, 1934   3 Sheets-Sheet 3
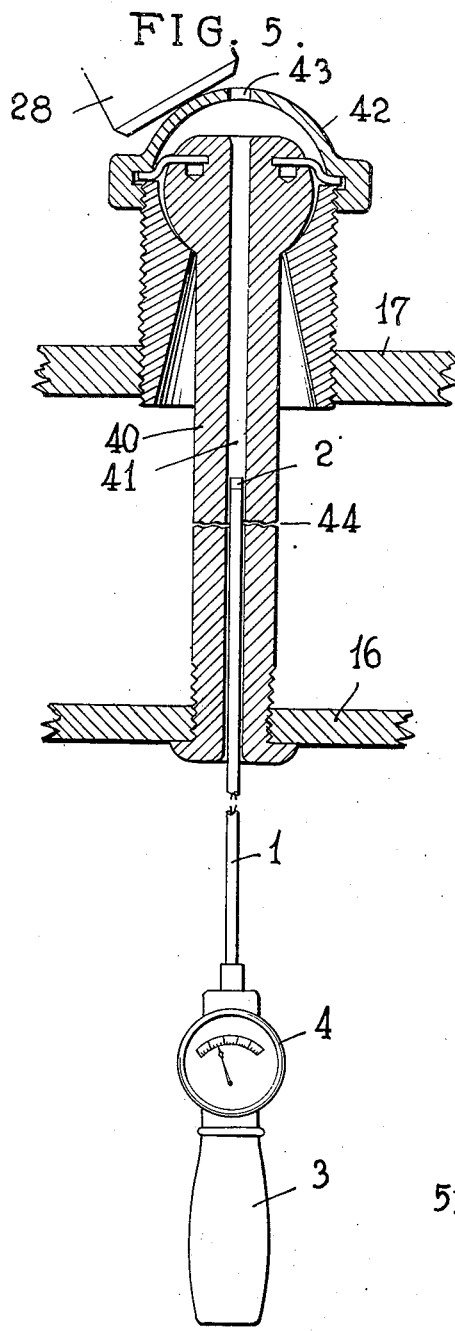
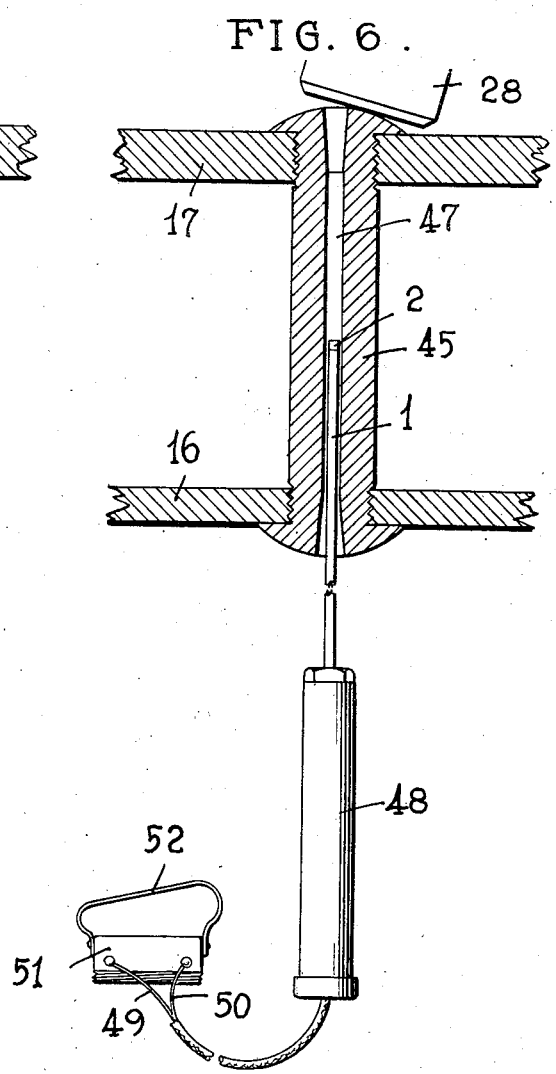
Grover R. Greenslade, Inventor
By Frank H. Wisch, Attorney Patented Dec. 28, 1937

2,103,256

UNITED STATES PATENT OFFICE 2,103,256

METHOD OF AND MEANS FOR TESTING STAYBOLTS

Grover R. Greenslade, Scott Township, Allegheny County, Pa., assignor to Pittsburgh Dry Stencil Company, a corporation of Pennsylvania Application September 4, 1934, Serial No. 742,656

10 Claims. (Cl. 175—183)

This invention pertains to new and improved methods of testing staybolts and to instruments to be used in connection with the said methods of testing. More particularly the invention relates to means for testing so-called telltale staybolts of either the flexible or rigid type.

Heretofore, boiler staybolts and in particular locomotive staybolts have been tested by various means. Flexible staybolts were originally tested by what is known as the hammer test. This method of testing was very expensive and uncertain. It was expensive because it required the removal of all fittings—the jacket, lagging, and even the caps which form the closures over the headed ends of the staybolts.

The hammer test was accomplished by tapping the heads of the staybolts after the removal of all of the above-mentioned equipment so that the operator might judge from the sound whether or not the bolts were broken. By this method, it was impossible for even an experienced operator to locate with certainty all of the broken bolts in a boiler.

A later and improved method of testing flexible staybolts by means of a so-called electrical contact tester, is disclosed in Patent #1,567,728, issued Dec. 29, 1925 to G. R. Greenslade. The invention described in said patent makes use of an electrical implement in conjunction with a telltale hole in a staybolt, the said hole extending from the fire sheet end of the staybolt into but not through the headed end thereof. The electrical contact tester in itself is used to determine whether or not the telltale hole is open throughout its entire length by making contact at the original closed end of the hole within the head of the staybolt, or in case of any clogging of the hole, indicating that the tester has not reached the said original closed end. In case the electrical testing implement indicates that the latter condition exists, the telltale hole is then cleaned out by means of a drill until the instrument indicates that the hole is clean and therefore functioning throughout the entire length.

The actual condition of the bolt itself is then determined by applying to the boiler the hydrostatic test which indicates any broken bolts by leakage of water through the telltale hole and into the firebox. It is evident therefore that the said electrical contact tester does not test in a direct manner the condition of a bolt but rather that of the telltale hole.

It is the purpose of the present invention to provide a tester which, when inserted into the telltale hole of a staybolt, indicates directly whether or not the bolt is fractured and at the same time in case of fracture, its location along the length of the bolt.

Other devices have been proposed to accomplish the above-mentioned purpose, involving complex circuits, sliding contacts, etc., which encumber the process of testing considerably and render the carrying out of the test difficult and uncertain. In the present invention, however, a new and simplified electrical testing unit is provided which requires no external contacts, or electrical leads of any kind for connecting it to other means or appliances. The instrument is simple of operation and results of tests are quickly obtained therewith.

The apparatus used in the present invention and the method of performing the test can be easily understood by referring to the accompanying drawings and to the detailed description provided below.

In the drawings:—

Fig. 1 is an elevational view of a testing implement;

Fig. 2 is an enlarged longitudinal sectional view of the pilot or exploring end of the testing implement shown in Fig. 1;

Figs. 2a and 2b are enlarged longitudinal sectional views of modified forms of the pilot or exploring end of the testing implement;

Fig. 3 is a view illustrating one manner in which a testing implement is employed in the telltale hole of a flexible staybolt installation, the staybolt and portions of the inner and outer sheets of a boiler being shown in section;

Fig. 4 is a view, partly in section, of an electromagnet used in connection with the test for energizing the boiler and staybolts as hereinafter described;

Fig. 5 is a view illustrating the use of a testing implement in connection with a flexible staybolt assemblage in which the telltale hole extends all of the way through the bolt and is accessible from either end; and Fig. 6 is a view illustrating the application of a modified form of the invention to the testing of staybolts, the staybolt shown in section being of the rigid type having a telltale hole extending longitudinally all of the way through the bolt.

Although I have illustrated in Figs. 3, 5 and 6 the use of my invention in testing but few of the types of telltale staybolts which have been devised, it is to be understood that the invention may be employed in the testing of any or all of such telltale staybolts.

The term "telltale staybolts" as used in the specification and claims for my invention signifies and includes all types of staybolts that have a passage extending longitudinally, partly or entirely through the staybolt.

In the description that follows, similar parts of the apparatus shown in the various figures are designated by the same numeral.

Referring to the essential parts of the testing implement and equipment involved as shown in the various figures, we have in Fig. 1, an exploring rod 1, made of hollow non-magnetic tubing such as brass, a pilot tip 2 at the extreme end of said exploring rod 1, a handle 3 to which the exploring rod 1 is attached, and an electrical mil-ammeter 4 mounted conveniently on the handle 3.

Fig. 2 illustrates the electrical and magnetic parts which are contained in the exploring rod 1. As may be seen from the figure, the pilot tip 2 is an extension of one end of a spool-shaped member that lodges within the end of the exploring rod 1. The narrow portion 5 (hereinafter designated as a core) of the spool-shaped member serves as a core for a coil 6 of insulated copper or other suitable wire that occupies the annular space between the axially disposed portion 5 of the spool and the inner wall of the tubular exploring rod 1. The spool-shaped member including the pilot tip 2 and the core 5 is made of ferrous or other magnetic metal or alloy preferably of high magnetic permeability and low retentivity.

The end portions 7 and 8 of the coil of wire 6 extend through small drilled holes 9 and 10 respectively in the inner head end 11 of the spool-shaped member. The ends of the wires 7 and 8 are connected by means of soldered joints 12 and 13 to heavy lead wires 14 and 15 which extend through the length of the tubular exploring rod 1 to the terminals of the electrical mil-ammeter 4 mentioned in connection with Fig. 1. It may be seen that in this manner, the electrical circuit of the meter and coil is completed.

Referring to Fig. 3, in the assemblage shown, 16 represents a portion of the inner or firebox sheet of a locomotive boiler. Extending between the fire sheet 16 and the wrapper sheet 17 of the locomotive boiler, is a flexible staybolt 18 having a telltale hole 19 extending from the fire sheet end of the bolt into but not through the headed end 20. The headed end 20 of the bolt 18 is inclosed by a cap 21 which has a weld 22 which secures the cap 21 to the wrapper sheet 17 and prevents the escape of steam or water from the boiler. The wrapper sheet 17 has a counterbore 23 adapted to form a seat for the headed end 20 of the flexible staybolt 18. The fire sheet end of the flexible staybolt 18 has a thread 24 by means of which the staybolt is screwed through the fire sheet 16. After the flexible staybolt 18 is screwed in as described, it is riveted over as shown at 25. The bolt 18 as shown in the figure has a fracture 26 extending laterally part of the way through the bolt. The exploring rod 1, for purposes of illustrating the heavy electrical leads 14 and 15, is shown broken at 27, and is furthermore illustrated as having been inserted part of the way into the telltale hole 19 of the flexible staybolt 18 so that the pilot tip 2 has passed somewhat farther into the telltale hole than the position of the fracture 26. The significance of this particular location of the pilot tip 2 during the insertion of the exploring rod 1 will be appreciated when the method of locating a fracture is explained.

An electromagnet is shown with the free end 28 of its core placed in contact with the cap 21. The electromagnet is shown in section in Fig. 4 in which 29 represents the core of the magnet made of ferrous metal or alloy and preferably laminated to prevent eddy currents. Retaining discs 30 and 31 and a cylindrical sheet 32 serve to enclose the annular space which contains a magnetizing coil 33 composed of many turns of insulated copper wire. The leads 34 and 35 of the magnetizing coil 33 pass out from the annular space through the holes 36 and 37 respectively in the retaining disc 31 so that they may be connected to any convenient power line such as 110 or 220 volts of alternating current. If desired a handle 38 may be provided as a means for holding the electromagnet in position as shown in Fig. 3.

The method of testing the telltale flexible staybolts of a locomotive boiler as employed by this invention is as follows:—

The energizing electromagnet described above is connected to an A. C. power line as explained and is then placed so that the pole 28 is in contact with the wrapper sheet 17 of the boiler or in contact with a cap 21 which may be in the vicinity of a group of telltale staybolts which are to be tested. When in this position and energized by the power circuit, an alternating magnetic field is set up in all parts of the ferrous structure adjacent to the point of contact of pole 28 of the electromagnet. Each staybolt in the vicinity therefore is magnetized with a flux of alternating polarity and the lines of magnetic force extend along these bolts substantially parallel to their axes. If therefore the exploring rod 1 is thrust into the telltale hole 19 of the staybolt 18 and is caused by the operator to move so that the pilot tip 2 of the exploring rod 1 traverses the length of the telltale hole from its opening at the fire sheet end of the staybolt 18 to the termination of the telltale hole 19 within the headed end 20 of the staybolt 18, some of the magnetic lines of force passing through the bolts are diverted from their axial direction and pass through the core 5 of the coil 6 in the exploring rod 1. In accordance with the laws of electromagnetic induction, these diverted alternating lines of magnetic force which pass through the core 5 of the coil 6 induce in the coil 6 an alternating electric current, the presence of which is indicated by the mil-ammeter 4. If no fracture is present in the staybolt the deflection of the needle of the mil-ammeter 4 remains substantially constant as the pilot tip 2 is moved along the telltale hole by the operator as described above.

If, however, the bolt 18 is fractured as shown at 26, the ferrous cross section of the staybolt 18 at right angles to the axis of the bolt at the position of the fracture is diminished and the area of solid metal available for containing the alternating lines of force which extend through the bolt is diminished, with the result that when the core 5 is in such a position as to stand or bridge over the fracture 26 a relatively large number of lines of magnetic force within the body of the bolt are diverted so as to pass through the pilot tip 2 and through the core 5. In such a position therefore the alternating current generated in the coil 6 of the testing implement is greatly augmented and the needle of the mil-ammeter 4 therefore indicates a much larger current. The position of the exploring rod 1 illustrated in Fig. 3 is approximately such a position.

It may be seen from this that the operator while observing the needle of the mil-ammeter 4 of the testing implement as he moves the exploring rod along the telltale hole 19 of the staybolt 18 can determine and locate a fracture by the sudden increase of electrical current indicated by the increase in deflection of the needle of the mil-ammeter 4.

A valuable feature of this invention as already pointed out is that the testing implement enables the operator to determine directly a fracture in the bolt. An added advantage of this invention is that it is not necessary that the bolt be broken completely across or even that the fracture has extended sufficiently far to reach the telltale hole of a staybolt inasmuch as a relatively small fracture of the staybolt will increase the number of lines of the alternating magnetic field which are diverted so as to pass through the pilot tip at the end of an exploring rod and through the core of the coil within an exploring rod. An experienced operator is therefore able to locate readily a fracture in a staybolt and is able to tell approximately the extent of such fracture by the relative-increase of the deflection of the needle of the mil-ammeter 4.

A still further advantage of this invention is that it also provides a means of ascertaining whether or not the telltale hole is open and unobstructed throughout its entire length. The latter advantage is made evident by the following explanation:

In Fig. 3 the exploring rod 1 is shown only partly inserted in the telltale hole 19 of the staybolt 18 so that the pilot tip 2 at the end of the said exploring rod 1 is located at a considerable distance from the closed end 39 of the telltale hole 19 within the head 20 of the staybolt 18. If however, the exploring rod 1 is thrust into the telltale hole 19 until the pilot tip 2 makes contact with said inner end 39 of the telltale hole such contact at this point will cause an unusually large amount of the magnetic flux within the boundary of the staybolt to be deflected so as to pass into the pilot tip 2 and through the core 5 (shown in enlarged section Fig. 2).

While the above described contact exists, an unusually large electromotive force is generated in the coil 6 (also shown in Fig. 2) resulting in a larger electrical current through the mil-ammeter 4. The unusually large deflection of the needle of the mil-ammeter makes known to an operator that the pilot tip has reached the original closed end of the telltale hole of the bolt within the head thereof. It is evident from this that an operator, experienced in the practice of testing staybolts by means of the above-described implement and appurtenances, is able to determine not only the condition of the bolt as regards fracture thereof, by following the procedure hereinbefore described, but also the condition of the telltale hole.

For example, if the testing implement, when thrust into the telltale hole as far as possible, does not give indication of having reached the original closed end of the hole, it is evident that some obstruction such as rust, corrosion or scale is present in a portion of the hole and that this must be removed, by means of a drill, or other suitable implement before the test may be completed. The latter is necessary since it is possible that a fracture may exist in the bolt beyond the position of stoppage. If however the hole is cleaned out, and the testing implement when fully inserted indicates that the pilot has reached the original closed end of the hole, then the entire length of the telltale hole may be explored and any existing fracture located.

In Fig. 5, a staybolt 40 is shown provided with a telltale hole 41 accessible from either end, the cap 42 at the head end being provided with an opening 43 in line with the said telltale hole 41. The staybolt is shown with a fracture 44 extending laterally all of the way through. The exploring rod 1 is shown in its approximate position for locating the fracture. Although the exploring rod is shown inserted in the telltale hole from the fire sheet end of the staybolt, it is readily seen that the test can be carried on just as effectively by inserting the exploring rod through the head end of the staybolt.

In Fig. 6, a staybolt 45 of the rigid type having a telltale hole 47 extending all of the way through it, is shown. The testing implement differs from the implement shown in Fig. 1 and succeeding figures in that the handle 48 of the exploring rod 1 does not have an ammeter attached thereto. The wires, 49 and 50 extend from the coil within the exploring rod, pass through the handle 48, and are connected to the terminals of an ammeter which is arranged in a separate casing 51 adapted to be applied to the body of the operator by means of a strap 52.

As shown in Fig. 2a, the exploring end of the testing implement may be provided with a pilot tip 2' of slightly larger diameter than that of the tube 1. In the form shown in Fig. 2b, the pilot tip is shown entirely embedded within the end of the tube 1. The outer end 53 of the spool-shaped member on which the coil 6 is wound, is exposed and is flush with the end of the tube 1.

It is to be understood that the invention described and illustrated herein covers broadly the application of principles which have been explained, and that various modifications may be made within the scope of the invention, including, for instance, the following:—

Current indicating devices other than the mil-ammeter mentioned herein may be employed and such devices may or may not be attached to the handle of the testing implement.

Whereas I have illustrated a particular means of magnetically energizing the system by employing an electromagnet as described, other means of energizing the system may be used. Furthermore, it is not necessary that the energizing means be applied at the wrapper sheet end of the staybolt but may be applied in the vicinity of the fire sheet end. If desired, a solenoid may be used instead of an electromagnet.

Whereas I have described the use of the invention in connection with an alternating current, it may equally well be employed by the use of direct current in conjunction with an interrupter, or by means of the current induced in the testing implement circuit by the opening or closing of a direct current energizing circuit. Still other modifications than the above may be employed in the utilization of my invention.

The following copending applications include methods of testing telltale staybolts and telltale holes thereof, and means for testing the same: Ser. No. 757,378, filed Dec. 13, 1934; Ser. No. 757,379, filed Dec. 13, 1934; Ser. No. 24,403, filed May 31, 1935; Ser. No. 27,587, filed June 20, 1935; Ser. No. 27,588, filed June 20, 1935.

I claim:—

1. Apparatus for ascertaining the condition of a telltale staybolt temporarily energized by substantially longitudinal alternating magnetic flux, the said apparatus including a testing implement provided with an attenuated portion movable within the telltale hole of the bolt for determining the condition of the bolt by magnetic exploration of the telltale hole thereof.

2. A testing implement for telltale staybolts, the said implement comprising a tubular member adapted for insertion in the telltale hole of a staybolt, an electromagnetic coil within the said member, a handle for the said member and an electrical meter in the circuit of the said electromagnetic coil the said coil being movable with respect to a staybolt while exploring a magnetic field in the bolt throughout every breakable portion thereof.

3. In apparatus for testing a telltale staybolt assemblage comprising a staybolt having a telltale hole the said staybolt engaging the inner and outer plates of a boiler; an electromagnet for temporary association with the staybolt and an electromagnetic coil constructed to move within the telltale hole of said staybolt to denote by exploration of magnetic flux from the said magnet the condition of the bolt throughout every breakable portion thereof.

4. Apparatus for testing a telltale staybolt having an alternating current electromagnet associated therewith whereby the bolt is magnetized substantially longitudinally with an alternating flux, a testing implement comprising a rod and a handle, an insulated coil within the rod, an electrical meter attached to the said handle, the said meter being connected in the circuit of the coil, the said rod being insertable in the telltale hole of the staybolt and movable therein while determining the condition of the bolt by measuring the intensity of the magnetic flux within the telltale hole of the bolt throughout the entire length of the said telltale hole.

5. In apparatus for testing a staybolt assemblage, including a bolt having a telltale hole said bolt engaging the inner and outer sheets of a boiler, an electromagnet temporarily associated with the staybolt, an electromagnetic coil constructed to move within and along the entire length of the telltale hole of the staybolt to denote directly by exploration of magnetic flux from the said magnet the condition of the bolt and of the telltale hole.

6. In a method of ascertaining directly the condition of staybolts having telltale holes, magnetizing a staybolt with a flux of alternating polarity, exploring the entire length of a telltale hole of a staybolt with means in which current is adapted to be set up by induction, and noting whether there is a variation in the current, thus set up in the said means while the said staybolts are in place and functioning as stays, whereby the presence or absence of defects is determined directly from the staybolt tested and without comparison with another bolt.

7. An implement for testing telltale staybolts, said implement containing a magnetic exploring coil insertable within the telltale hole of a staybolt and a current indicating device electrically connected to the said magnetic exploring coil, the said implement being movable with respect to a staybolt adapted to explore a magnetic field in the bolt in spaced relation thereto throughout every breakable portion thereof and while the staybolt is in place in a boiler whereby the presence or absence of defects is determined directly from the bolt tested and without comparison with another bolt.

8. A testing implement for determining the condition of telltale staybolts, the said implement including means adapted for magnetic exploration of the telltale hole of the said staybolts in spaced relation thereto throughout the entire length of the said telltale hole while the staybolts are in place in a boiler, whereby the presence or absence of defects is determined directly from the bolt tested and without comparison with another bolt.

9. A testing implement for use with staybolts having telltale holes, the said implement being adapted to indicate directly the condition of the staybolts and of the telltale holes thereof and the said implement including a single testing member movable with respect to a staybolt while the staybolt is in place in a boiler and adapted to explore a magnetic field in the bolt in spaced relation thereto throughout every breakable portion thereof, the said member including means whereby the presence or absence of defects is determined directly from a bolt tested and without comparison with other bolts.

10. In a method of ascertaining the condition of staybolts having telltale holes, magnetizing a staybolt with a flux of alternating polarity, and while so magnetizing the said staybolt exploring the telltale hole of the said staybolt with means in which electric currents are established, and passing the said means through the entire length of the telltale hole, and noting by electrical indicating means during the exploration of the telltale hole the presence or absence of fractures in the staybolt and of non-conducting accumulations in the telltale hole.

GROVER R. GREENSLADE.